United States Patent [19]

Palekhin et al.

[11] 4,210,902
[45] Jul. 1, 1980

[54] DEVICE FOR TELEMETERING LOADS ON POWER TRANSMISSION LINE CONDUCTORS

[76] Inventors: Vladimir A. Palekhin, ulitsa Chernyakhovskogo, 30, kv. 56, Smolensk; Alexandr A. Neiman, Volgogradsky prospekt, 169, kv. 10; Veniamin G. Kagan, Golikovsky pereulok, 13, kv. 1, both of Moscow, all of U.S.S.R.

[21] Appl. No.: 7,258

[22] Filed: Jan. 29, 1979

[51] Int. Cl.$^2$ .................... G01B 15/02; G08C 17/00; G08B 21/00; H02G 7/16
[52] U.S. Cl. ................................ 340/310 A; 340/580; 340/666; 340/201 R
[58] Field of Search ............... 340/310 R, 207 R, 556, 340/580, 583, 666, 521, 201; 307/112

[56] References Cited

FOREIGN PATENT DOCUMENTS

| | | | |
|---|---|---|---|
| 1431751 | 4/1976 | United Kingdom | 340/580 |
| 508843 | 5/1976 | U.S.S.R. | 340/580 |

*Primary Examiner*—Donald J. Yusko
*Attorney, Agent, or Firm*—Lackenbach, Lilling & Siegel

[57] ABSTRACT

A device for telemetering loads on power transmission line conductors comprising load sensors installed along a power transmission line at the points of suspension of the line conductors to supporting structures, and ice load sensors mounted directly on the line conductors. The outputs of each load sensor and ice load sensor are connected to respective inputs of a respective transducer converting the sensor output signal into a high-frequency signal delivered to the high-frequency signal receiver. Each ice load sensor has a source of radioactive radiation and a radiation detector. Such an embodiment of the device for telemetering loads on power transmission line conductors allows determination of the magnitude of the ice load component of the resultant load on the line conductor.

1 Claim, 2 Drawing Figures

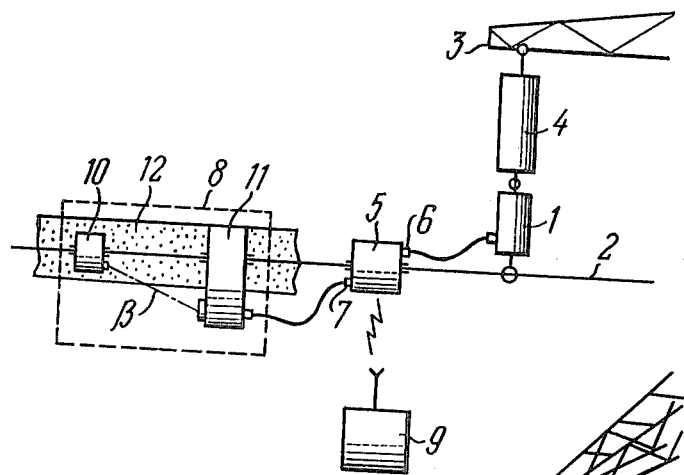
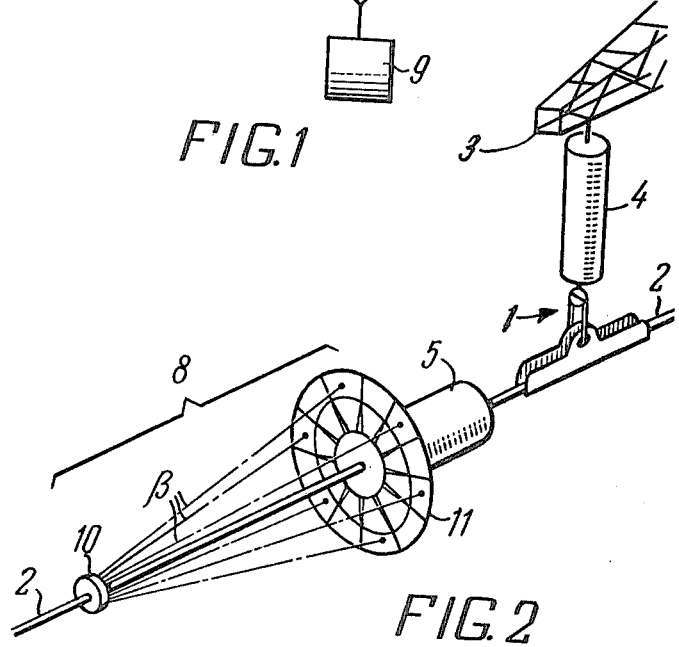

DEVICE FOR TELEMETERING LOADS ON POWER TRANSMISSION LINE CONDUCTORS

FIELD OF THE INVENTION

This invention relates to electric power transmission lines and, more particularly, to a device for telemetering the effect of loads on the line conductors.

The invention is used for monitoring the loads created on overhead line conductors by accumulated ice and may also serve for measuring other line conductor loads, such as wind pressure and the dynamic stresses due to the conductors swinging with a considerable amplitude.

DESCRIPTION OF THE PRIOR ART

Known in the art is a device for telemetering loads on power transmission line conductors (cf. "Energetika za Rubezhom", Telemetering of Ice Loading of Power Transmission Line Conductors, BTI ORGRES, Moscow, 1967, p.3–14, FIG. 1) comprising load sensors arranged along power transmission lines located in regions where ice and sleet is a problem. Each load sensor is attached to the point of suspension of the line conductor to the supporting structure and is coupled electrically to a transducer converting the load sensor output signal into a high-frequency signal, which is supplied via a communication channel to the high-frequency signal receiver installed at the nearest substation or at the control station.

The device also has ice load sensors mounted on the power transmission line and coupled electrically to a transducer converting the sensor output signal into an electric signal.

The above-mentioned device for telemetering the loads on power transmission line conductors measures the resultant conductor load including the weight of the conductor and of the accumulated ice, wind pressure and the dynamic stresses caused by the swinging of the conductor. The wind pressure may alter the resultant conductor load by several hundreds of kilograms. The most important component of the resultant conductor load is the ice loading that can be eliminated effectively by melting the ice.

The data on the degree of conductor loading is transmitted by radio from the line supporting structure carrying the load sensor to the substation or control station receiver.

The ice load sensor and the radio communication antenna are mounted on a wooden pole and transmit the ice load signal before the ice accumulates on the line conductors.

The ice load sensor comprises a spherically wound piece of wire suspended so that a weight of 60 to 90 grams of ice accumulated on the wire causes the operation of a microswitch which switches over the signal transmission line from the load sensor.

Thus, the information on the ice loading of the line conductor contains data on the conductor load and the appearance of ice. However, the installation of the ice load sensor beyond the line conductor does not allow the obtainment of reliable information on the actual degree of ice loading of the power transmission line conductors.

The device employing a spherical ice load sensor also has other disadvantages. The data provided by the device has to be analyzed each year to establish the correlation between the rate of ice accumulation indicated by the ice load sensor and the subsequent accumulation of ice on the line conductors. Moreover, the ice load sensor is subject to frequent mechanical failures and has a tendency to freeze.

Another disadvantage of the know device is that it does not provide reliable information on the ice loading of a line conductor, which makes it impossible to take a proper decision as to the necessity and efficiency of melting the accumulated ice.

SUMMARY OF THE INVENTION

It is an object of the present invention to provide a highly efficient device for telemetering loads on power transmission line conductors.

Another object of the present invention is to simplify the design features of the device.

These objects are accomplished by a device for telemetering loads on power transmission line conductors, which comprises load sensors arranged along transmission lines, located in ice and sleet hazardous locations, and attached at the points of suspension of the line conductors to supporting structures. These sensors are coupled electrically to a respective transducer converting the load sensor output signal into a high-frequency signal delivered to a high-frequency signal receiver. Ice load sensors are mounted on the power transmission line and coupled electrically to a respective transducer which converts the ice load sensor output signal into a high-frequency signal. In accordance with the invention, each ice load sensor is provided with a source of radioactive radiation, secured directly on one of the line conductors, and a radioactive radiation detector mounted on the same line conductor in the path of the radiation and coupled electrically to the transducer converting the load sensor output signal into a high-frequency signal.

Such an embodiment of the hereinproposed device for telemetering loads on power transmission line conductors makes it possible to establish the nature of the resultant load and determine the magnitude of the ice load component, thereby allowing the ice to be efficiently melted without undue losses.

BRIEF DESCRIPTION OF THE DRAWINGS

The invention will be further described by way of example with reference to the accompanying drawings, wherein:

FIG. 1 is a schematic representation of a device for telemetering loads of power transmission line conductors in accordance with the present invention;

FIG. 2 is an isometric representation of the device for telemetering loads of power transmission line conductors in accordance with the present invention.

DETAILED DESCRIPTION OF THE INVENTION

The hereinproposed device for telemetering loads on power transmission line conductors comprises load sensors 1 (FIG. 1) installed along a power transmission line passing through a region affected by ice accumulation on the line conductors. Such areas are determined from the results of meteorological surveys. Each load sensor 1 is fixed in place at the point of suspension of a line conductor 2 to a supporting structure 3 between insulators 4 and the line conductor 2. The load sensors 1 may be of any known type employed for such a purpose.

In the vicinity of the load sensor 1, the same line conductor 2 carries a transducer 5 to convert the load sensor output signal into a high-frequency signal. The transducer has two inputs 6 and 7. The load sensor 1 is coupled electrically to the transducer 5 by its output being connected to the input 6 of the transducer 5.

The device has an ice load sensor 8 also attached to the line conductor 2 and having its output connected to the input 7 of the transducer 5. The transducer 5 converts the signals delivered from the load sensor 1 and the ice load sensor 8 into a high-frequency signal and supplies it to a telemetering signal receiver 9. The signals of the load sensors 1 and 8 are supplied successively by a time switch (not shown) of the transducer that converts the load sensor signals into high-frequency signals. An inductive source of supply may be used for the device (cf. "Energetika za Rubezhom", Telemetering of Ice Loading of Power Transmission Line Conductors, BTI ORGRES, Moscow, 1967, p. 11, FIG. 5). The ice load sensor 8 comprises a source 10 of radioactive radiation mounted directly on the line conductor and a radiation detector 11 fitted on the same line conductor in the path of the radiation.

Since the ice layer 12 is usually of unequal thickness around the perimeter of the line conductor 2, it is advantageous to employ an annular ice load sensor 8 (FIG. 2).

The source 10 of radioactive radiation is in the form of a cylindrical container mounted coaxially on the line conductor 2. The end of the container, facing the detector 11, has radiation emitting openings evenly distributed along the circumference of the end face. The diameter of the container is 1 to 2 mm greater than that of the line conductor 2.

The detector 11 of radioactive radiation is in the form of a ring with stiffening ribs mounted coaxially on the line conductor 2. The end of the detector 11, facing the source of radiation 10, has radiation sensitive elements evenly spaced along a circumference 2 to 20 mm greater in diameter than the permissible thickness of the ice accumulated on the line conductors. The permissible thickness of the ice layer is determined according to the mechanical strength of the line conductors.

The openings emitting the radioactive radiation are made so that the radiation is incident upon the sensitive elements of the detector 11.

The hereinproposed device for telemetering loads on power transmission line conductors operates in the following manner.

When ice accumulates or wind blows on the line conductor 2 (see FIG. 1), the load sensor 1 produces a signal in proportion to the resultant load. The load sensor output signal is supplied to the input 6 of the transducer 5 that converts it into a high-frequency signal. The radioactive radiation emitted by the source 10 passes through the layer of ice 12 and is partially absorbed by the layer of ice. The remaining part of the radiation is received by the detector 11 and becomes an electric pulse delivered to the transducer 5 which converts it into an electric signal.

The ransducer 5 supplies the communication channel with a high-frequency carrier periodically time-modulated so as to deliver the ice load signal of the sensor 8 and the load signal of the sensor 1 separately. The ice load carrier signal of the sensor 8 has, for instance, a 3-sec duration and the load carrier signal of sensor has a 4-sec duration. The interval between the two signals may be, for instance, of 10-sec duration. The difference in time of delivery of the high-frequency carrier signal makes it possible to distinguish between the information obtained from the signals of the sensors 1 and 8.

The radio communication channel or high-voltage phase-ground conductor of the power transmission line may serve as the communication channel delivering the high-frequency signal to the receiver 9.

What is claimed is:

1. A device for telemetering loads on power transmission line conductors, comprising:
   a plurality of load sensors installed along a power transmission line to measure the load on the line conductors, each load sensor being fixed in place at a point of suspension of one of said line conductors to a supporting structure of said power transmission line and having an output;
   a plurality of transducers converting the load sensor output signal into a high-frequency signal, the number of said transducers being equal to the number of said load sensors, each transducer shaping and transmitting a high-frequency signal, and having two inputs, a first of said inputs being connected to the output of a respective load sensor;
   sources of power for said transducers;
   a plurality of ice load sensors mounted along said power transmission line, each ice load sensor being attached to said line conductor and having an output connected to a second of said inputs of a respective transducer, said ice load sensors producing an output signal in proportion to the thickness of the ice layer accumulated on said line conductor;
   sources of radioactive radiation mounted on said line conductor, each source of radioactive radiation being mounted in relation to a respective ice load sensor;
   a detector of radioactive radiation mounted on said line conductor in the path of the radiation from a respective source of radioactive radiation; and
   a high-frequency signal receiver receiving the signals of said transducers.

* * * * *